United States Patent
Palfenier et al.

(10) Patent No.: US 6,359,430 B1
(45) Date of Patent: Mar. 19, 2002

(54) VEHICLE SPEED SENSOR WITH MOLDED SHUNT RESISTOR

(75) Inventors: Samuel Roland Palfenier, El Paso, TX (US); Cecilia Hernandez, CD. Juarez Chih. (MX)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/450,907

(22) Filed: Nov. 29, 1999

(51) Int. Cl.[7] .......................... G01P 3/488; G01P 1/02; H01F 17/04; H01F 27/28
(52) U.S. Cl. ................ 324/174; 324/207.15; 29/602.1; 174/52.2; 336/192
(58) Field of Search ...................... 324/207.15, 207.16, 324/173, 174; 336/92, 96, 192; 174/52.2; 29/602.1, 606, 607, 595; 264/272.11, 272.15, 272.16, 272.19; 73/514.39

(56) References Cited

U.S. PATENT DOCUMENTS

| | | | | |
|---|---|---|---|---|
| 4,299,374 A | * | 11/1981 | Yamanaka | ............... 336/192 X |
| 4,656,733 A | * | 4/1987 | Maenishi et al. | |
| 5,101,155 A | * | 3/1992 | Oehler et al. | ............ 324/173 X |
| 5,196,793 A | * | 3/1993 | Good et al. | ......... 324/207.15 X |
| 5,278,496 A | * | 1/1994 | Dickmeyer et al. | . 324/207.15 X |
| 5,426,844 A | * | 6/1995 | Suda et al. | ......... 324/207.15 X |
| 5,486,758 A | * | 1/1996 | Hammerle | .......... 324/207.15 X |
| 5,563,510 A | * | 10/1996 | Gorrell et al. | ...... 324/207.15 X |
| 6,157,284 A | * | 12/2000 | Kanazawa | ............... 336/192 X |

* cited by examiner

*Primary Examiner*—Gerard R. Strecker
(74) *Attorney, Agent, or Firm*—Margaret A. Dobrowitsky

(57) ABSTRACT

A vehicle speed sensor includes a hollow generally cylindrical sensor housing with an open proximal end. Within the interior of the sensor housing is a sensing structure having a base and a coil. A shunt resistor and two terminals are insert molded into the base of the sensing structure, with the resistor disposed between the terminals. Two electrical leads, that are electrically connected to the coil, are wrapped around each end of the shunt resistor and the immediately adjacent terminal. The electrical lead not only electrically connects the terminals to the coil, but it also electrically connects the shunt resistor to the terminals.

17 Claims, 1 Drawing Sheet

VEHICLE SPEED SENSOR WITH MOLDED SHUNT RESISTOR

TECHNICAL FIELD

The present invention relates to motor vehicle speed sensors.

BACKGROUND OF THE INVENTION

Transmission-mounted vehicle speed sensors have been provided to sense the speed of a vehicle. Some transmission speed sensors have electromagnetic sensing structures that include a thin wire wound around a post to create a coil. In turn, the coil is electrically coupled to a pair of terminals by a pair of electrical leads. To render an appropriate circuit, a shunt resistor is installed across the terminals. Typically, the electrical leads are connected to the terminals and then, in a separate process step, the shunt resistor is attached to the terminals by either crimping or spot welding them together. The extra step to connect the shunt resistor to the terminals consumes time and increases costs.

Accordingly, the present invention recognizes the need for a speed sensor in which the shunt resistor is connected in such a manner that minimizes manufacturing time and costs.

SUMMARY OF THE INVENTION

A vehicle speed sensor includes a sensor housing and a sensing structure disposed within the sensor housing. The sensing structure includes a coil wound around a base and a shunt resistor that is molded into the base and electrically connected to the ends of the coil.

As envisioned in the particularly preferred embodiment set forth below, the coil is connected to two rigid electrical terminals and the shunt resistor is disposed on the base between the terminals and closely spaced therefrom. The shunt resistor has two ends and the sensor further includes at least two electrical leads that are wrapped around the terminals and the ends of the shunt resistor.

Preferably, the vehicle speed sensor includes a connector housing that is coupled to the sensor housing and a connector that is supported by the connector housing and electrically coupled to the terminals. The connector housing forms a socket around the connector, and the socket is sized to engage a complementarily-shaped and sized electrical connector. In a preferred embodiment, the connector housing defines a first axis and the sensor housing defines a second axis that is orthogonal to the first axis.

Also in a preferred embodiment, the connector housing is formed with at least one o-ring groove and an o-ring is disposed within the o-ring groove such that it establishes a seal between the sensor housing and the connector housing. The sensor housing further has an outer wall with an abutment flange that abuts a transmission housing.

In another aspect of the present invention, a vehicle speed sensor includes a sensor housing with a sensing structure disposed within. The sensing structure has a base and a coil. At least two terminals are supported on the base of the sensing structure and a shunt resistor is molded onto the base between the terminals to electrically connect them.

In yet another aspect of the present invention, a shunt resistor is electrically coupled to at least two terminals within a vehicle speed sensor. This is accomplished by providing a sensing structure that has a base, a coil, and at least two electrical leads electrically connected to the coil. A shunt resistor having two ends is insert molded within the base of the sensing structure so that it is juxtaposed with the terminals. The electrical leads are then wound around the ends of the shunt resistor and the terminals so that each end of the shunt resistor is electrically connected to one terminal.

The present invention will now be described, by way of example, with reference to the accompanying drawings, in which:

DESCRIPTION OF AN EMBODIMENT OF THE INVENTION

Figure 1:
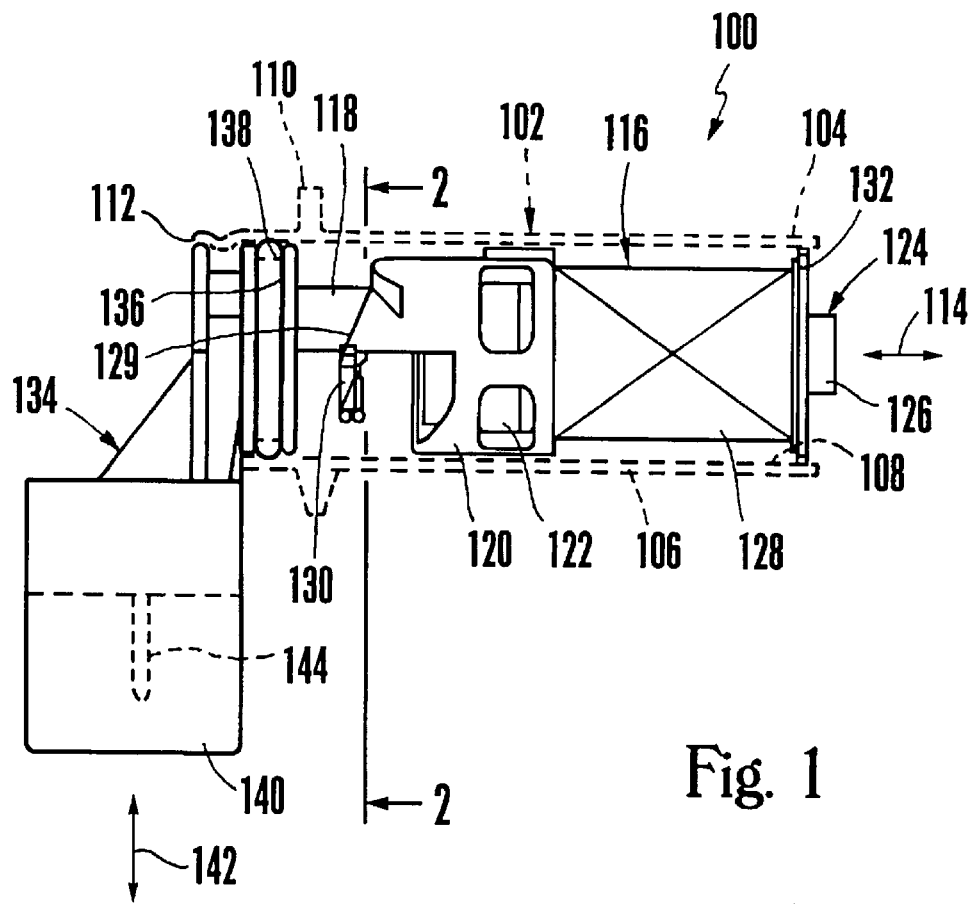
FIG. 1 is a side plan view of the sensor.

Referring initially to FIG. 1, a vehicle speed sensor is shown and generally designated 100. The speed sensor 100 includes a metal, or more preferably, a plastic hollow generally cylindrical sensor housing 102, shown in phantom, having an open distal end 104. The sensor housing 102 defines an outer wall 106 and an interior surface 108, and an abutment flange 110 is formed on the outer wall 106 to abut a transmission housing, with the open distal end 104 being disposed within the transmission housing in contact with transmission fluid. Opposite the open distal end 104, the sensor housing 102 is formed with an open proximal end 112, with a sensor housing axis 114 being defined between the ends 104, 112.

As shown in FIG. 1, a sensing structure 116 is disposed within the sensor housing 102. The sensing structure 116 has a base 118 that terminates at its proximal end in an enlarged magnet holder 120. A magnet 122 fills the magnet holder 120 and an elongated pole piece 124 fills a pole piece holder formed by the base 118. The magnet 122 is magnetically coupled to the pole piece 124, and the magnet 122 preferably contacts the pole piece 124. If desired, a distal segment 126 of the pole piece 124 can extend beyond the distal end 104 of the sensor housing 102.

FIG. 1 also shows that the sensing structure of the sensor 100 includes a hollow toroidal coil 128 of wire that closely surrounds the base 118. When energized, the coil 128 is magnetically coupled to the pole piece 124/magnet 122. The coil 128 includes two electrical leads 129 that connect the coil 128 to terminals 130. Bridging the terminals 130, in a manner described in detail below, is a shunt resistor 131.

In accordance with the present invention, both the terminals 130 and the shunt resistor 131 are supported on the base 118. In a preferred embodiment, the terminals 130 and the shunt resistor 131 are molded onto the base 118. Specifically, at least the resistor 131 is inserted molded onto the base 118 between the terminals 130.

A hollow disk-shaped sealing ring 132 extends radially outward from the distal end of the pole piece holder with the coil 128 being ensconced behind (i.e., proximal) to the sealing ring 132, and thus, protected from transmission fluid. With this structure, the pole piece 124 can be, e.g., coupled to a rotating component of a vehicle transmission, with an electric current that is representative of the speed of rotation accordingly being generated in the coil 128.

Additionally, a metal, or more preferably, a plastic connector housing 134 is coupled to the sensor housing 102. In a preferred embodiment, the connector housing is held within the proximal end 112 of the sensor housing 102 as shown. If desired, the connector housing 134 can be circumscribed by an o-ring groove 136, and an o-ring 138 can be disposed within the groove 136 to establish a seal between the housings 102, 134.

Still referring to FIG. 1, the connector housing 134 defines a hollow socket 140, and the socket 140 establishes an axis 142 that is orthogonal to the axis 114 of the sensor housing 102. One or more connectors, such as a pin 144, shown in phantom, are supported within the socket 140, it being understood that the pin 144 is electrically connected to the terminals 130 and hence, to the coil 128. The socket 140 is configured for engaging a complementarily-shaped connector (not shown) of a vehicle instrumentation system, for receiving the signal from the coil 128.

Figure 2:
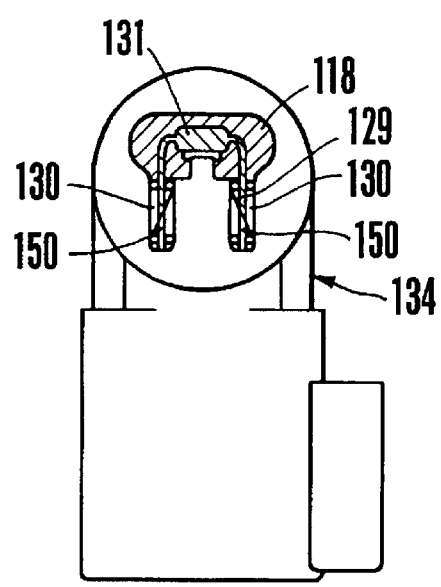
FIG. 2 is a partial cross sectional view along line 2—2 in FIG. 1.

Having described the overall structure of the sensor 100, attention is now directed to FIG. 2, which shows the details of the union between the terminals 130 and the shunt resistor 131. As mentioned above and as shown in FIG. 2, the shunt resistor 131 is insert molded into the base 118 of the sensing structure 116 and has two ends 150. Each end 150 of the shunt resistor 131 is closely juxtaposed with a terminal 130.

In order to connect the shunt resistor 131 to the terminals 130, the electrical leads 129 are wrapped around the ends 150 of the shunt resistor 131 and the terminals 130 and then soldered in place to firmly connect the leads 129 to respective terminals 130 and respective ends 150 of the shunt resistor 131. It is to be appreciated that the shunt resistor 131 and the terminals 130 are sufficiently close to each other such that when the electrical leads 129 are wrapped around the ends 150 of the shunt resistor 131 and respective terminals 130, the leads 129 touch the ends 150 of the shunt resistor 131 and the terminals 130.

As understood by the present invention, by using the electrical leads 129 to connect the shunt resistor 131 to the terminals 130, a secondary step to crimp or spot weld the shunt resistor 131 to the terminals 131 after the leads 129 are soldered to the terminals 130 is eliminated. This elimination of a step in the manufacturing process reduces costs and saves time.

While the particular vehicle speed sensor as herein shown and described in detail is fully capable of attaining the above-described objects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it is to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

What is claimed is:

1. A vehicle speed sensor comprising:
   a sensor housing; and
   a sensing structure disposed within the sensor housing, the sensing structure including a coil wound around a base and a shunt resistor molded into the base, the resistor being electrically connected to the coil, the coil not receiving power from a source of electricity at any time.

2. The vehicle speed sensor of claim 1, wherein the coil is connected to two rigid electrical terminals, the shunt resistor being disposed on the base between the terminals and closely spaced therefrom.

3. The vehicle speed sensor of claim 2, wherein the shunt resistor includes two ends and the sensor further comprises at least two electrical leads wrapped around the terminals and the ends of the shunt resistor.

4. The vehicle speed sensor of claim 3, further including a connector housing coupled to the sensor housing, and a connector supported by the connector housing, the connector being electrically coupled to the terminals.

5. The vehicle speed sensor of claim 4, wherein the connector housing forms a socket around the connector, the socket being sized to engage a complementarily-shaped and sized electrical connector.

6. The vehicle speed sensor of claim 4, wherein the connector housing defines a first axis and the sensor housing defines a second axis, the axes being orthogonal to each other.

7. The vehicle speed sensor of claim 4, wherein the connector housing is formed with at least one o-ring groove and the vehicle speed sensor further includes an o-ring disposed within the o-ring groove to establish a seal between the sensor housing and the connector housing.

8. The vehicle speed sensor of claim 1, wherein the sensor housing further includes an outer wall having an abutment flange to abut a transmission housing.

9. A vehicle speed sensor comprising:
   a sensor housing;
   a sensing structure having a base and a coil, the sensing structure disposed within the sensor housing, at least two terminals supported on the base of the sensing structure; and
   a shunt resistor molded onto the base between the terminals, the shunt resistor electrically connecting the terminals, wherein the coil is supported on the base and electrically connected to the terminals.

10. The vehicle speed sensor of claim 9, wherein the shunt resistor includes two ends and the sensor further comprises at least two electrical leads wrapped around the terminals and the ends of the shunt resistor.

11. The vehicle speed sensor of claim 10, further including a connector housing coupled to the sensor housing and a connector supported by the connector housing, the connector being electrically coupled to the terminals.

12. The vehicle speed sensor of claim 11, wherein the connector housing forms a socket around the connector, the socket being sized to engage a complementarily-shaped and sized electrical connector.

13. The vehicle speed sensor of claim 12, wherein the connector housing defines a first axis and the sensor housing defines a second axis, the axes being orthogonal to each other.

14. The vehicle speed sensor of claim 12, wherein the connector housing is formed with at least one o-ring groove and the vehicle speed sensor further includes an o-ring disposed within the o-ring groove to establish a seal between the sensor housing and the connector housing.

15. The vehicle speed sensor of claim 11, wherein the sensor housing further includes an outer wall having an abutment flange to abut the transmission housing.

16. A method for electrically coupling a shunt resistor having two ends to at least two terminals within a vehicle speed sensor comprising the acts of:

providing a sensing structure having a base, a coil, and at least two electrical leads electrically connected to the coil;

insert molding the shunt resistor within the base of the sensing structure so that the shunt resistor is juxtaposed with the terminals; and winding the electrical leads around the ends of the shunt resistor and the terminals, such that each end of the shunt resistor is electrically connected to one terminal.

17. The method of claim 16, further comprising the act of:

soldering the electrical leads in place around the ends of the shunt resistor and the terminals.

* * * * *